United States Patent [19]

Yamamoto

[11] 4,436,323

[45] Mar. 13, 1984

[54] LOCKING DEVICE FOR A MOVING ANCHOR OF A SEAT BELT

[75] Inventor: Kazuo Yamamoto, Sagamihara, Japan

[73] Assignee: NSK-Warner K. K., Japan

[21] Appl. No.: 403,406

[22] Filed: Jul. 30, 1982

[30] Foreign Application Priority Data

Sep. 3, 1981 [JP] Japan .................. 56-130376[U]

[51] Int. Cl.³ ............................................. B60R 21/10
[52] U.S. Cl. ..................................... 280/804; 297/469
[58] Field of Search ............... 280/802, 804, 808, 807, 280/801; 297/469

[56] References Cited

U.S. PATENT DOCUMENTS

| | | | |
|---|---|---|---|
| 4,256,331 | 3/1981 | Schwanz et al. | 280/804 |
| 4,302,031 | 11/1981 | Nishimura et al. | 280/804 |
| 4,375,897 | 3/1983 | Takada | 297/469 |

FOREIGN PATENT DOCUMENTS

| | | | |
|---|---|---|---|
| 55-110641 | 8/1980 | Japan | 280/804 |
| 55-127238 | 10/1980 | Japan | 280/804 |

*Primary Examiner*—Joseph F. Peters, Jr.
*Assistant Examiner*—Ross Weaver
*Attorney, Agent, or Firm*—Shapiro and Shapiro

[57] ABSTRACT

A locking device for a moving anchor used in an automatic seat belt system has an anchor member movable between a seat occupant restraining position and a seat occupant liberating position along a guide member secured to a vehicle body, a pivotable member pivotably mounted on the anchor member, a driving member operatively mounted on the pivotable member so as to pivotally move the pivotable member between a first position and a second position, a locking member provided on a base member secured to the vehicle body, and a biasing member biasing the locking member to a locking position.

5 Claims, 5 Drawing Figures

LOCKING DEVICE FOR A MOVING ANCHOR OF A SEAT BELT

BACKGROUND OF THE INVENTION

1. Field of the Invention

This invention relates to a locking device for a moving anchor of an automatic seat belt system which locks the anchor member when it comes to a seat occupant restraining position in response to the closing of a door and which unlocks the anchor member when it is about to move from the seat occupant restraining position to a seat occupant liberating position in response to the opening of the door.

2. Description of the Prior Art

A locking device is known in which a cam member is mounted on an anchor member for sliding movement in the direction of movement of the anchor member and a locking member for locking the anchor member is operated by the cam portion of the cam member to thereby effect unlocking.

SUMMARY OF THE INVENTION

It is an object of the present invention to provide a locking device in which, instead of a slidable cam member, employs a pivotable member mounted on an anchor member. The pivotable member has a locking surface engageable with a locking member for locking and has a cam surface engageable with the locking members for unlocking. The invention is reliable in operation and simple in construction.

The invention will become fully apparent from the following detailed description of an embodiment thereof taken in conjunction with the accompanying drawings.

DESCRIPTION OF THE PREFERRED EMBODIMENT

Figure 1:
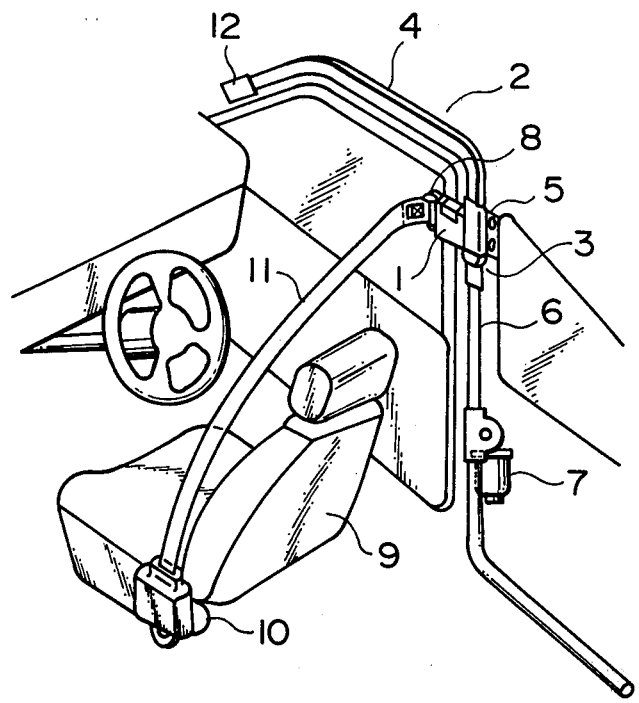
FIG. 1 shows an example of the automatic seat belt system to which an embodiment of the present invention is applied.

FIG. 1 shows an example of a two-point type automatic sheet belt system to which an embodiment of the present invention is applied. In this example, a buckle 1 acting with an anchor member slides between a rearward, seat occupant restraining position shown, at which a latch base 5 is secured, and a forward, seat occupant liberating position (the terms "forward" and "rearward" being used for convenience in stating the relationship between various parts described hereinafter). The buckle slides along a curved rail 4 secured to a side roof 2 and a center pillar 3. This sliding movement is accomplished by a driving member in an outer tube 6 being moved by a motor in a driving portion 7. Of course, the anchor member may also be driven by a mechanical drive utilizing the door opening-closing force.

A tongue 8 is usually locked to the buckle 1, and webbing 11 extends between the tongue 8 and a retractor 10 attached to the inner side of a seat 9. Limit switches such as switch 12, for stopping the aforementioned motor when the anchor member has come to the front or rear end of the curved rail 4 are attached to the front and rear ends of the curved rail 4 (in FIG. 1, only the limit switch located at the front end of the rail is shown).

Figure 2:
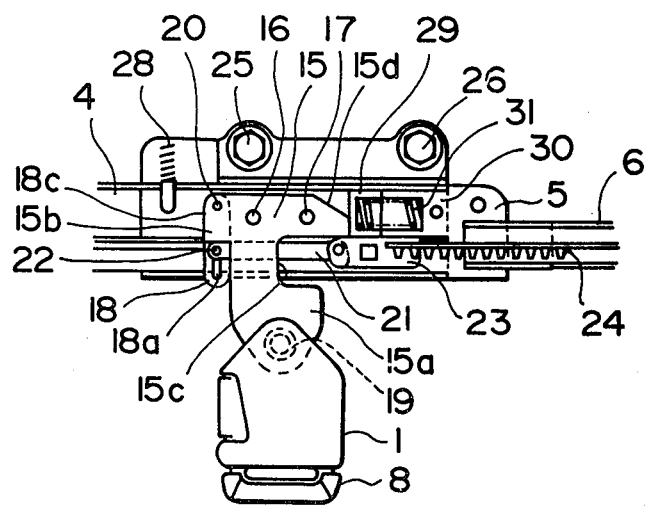
FIGS. 2 to 5 illustrate the construction and operation of an embodiment of the present invention.
Figure 5:
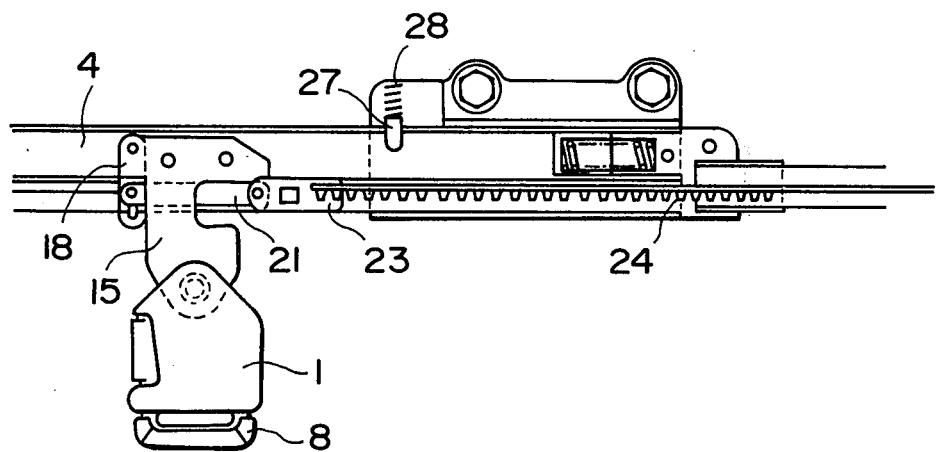

Reference is now made to FIGS. 2 and 5 to describe an embodiment of the present invention.

Pins 16 and 17 as strength members are attached to an anchor plate 15 slidable along the rail 4, and the buckle 1 is pivotably mounted to the downwardly projecting portion 15a of the anchor plate 15 by means of a pin 19, and an unlocking lever 18 is pivotably mounted in the groove of a bifurcated front end portion 15b by means of a pin 20. A slot 18a is formed in that end portion of the unlocking lever 18 which is opposite to the end portion adjacent to the center of pivotal movement of the lever 18, and a pin 22 projected from one end of a connecting rod 21 fits in the slot 18a. A rack 24 as a driving member is attached to the other end of the connecting rod 21 through a terminal 23. This rack is in mesh engagement with a pinion rotated by the motor and is moved thereby.

Figure 3:
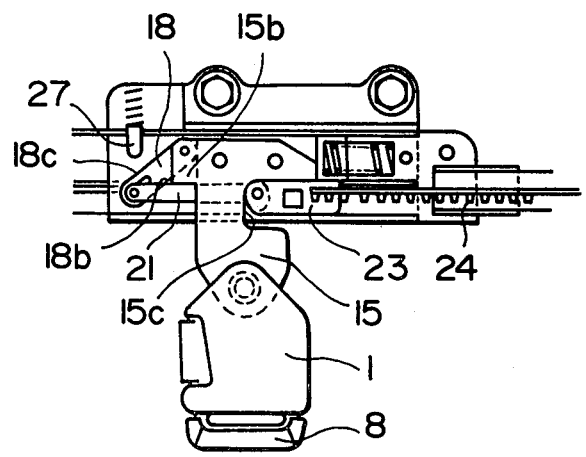

The unlocking lever 18 is pivotable between a position in which the connecting rod 21 has been moved most rearwardly with the pin 22 bearing against the upper edge of the slot 18a and the rear long edge 18b of the lever 18 strikes against the bottom surface of the groove of the bifurcated front edge portion 15b (FIG. 2), and a position in which the connecting rod 21 has been moved most forwardly with the pin 22 bearing against the lower edge of the slot 18a and the front end surface of the terminal 23 bearing against the rear end surface 15c of the cut-away portion of the anchor plate 15 (FIG. 3). When the lever 18 assumes the position of FIG. 2, the front end surface of the bifurcated front end portion 15b of the anchor plate and the front long edge 18c of the lever 18 become substantially flush with each other and form a locking surface at plane substantially perpendicular to the direction of movement of the anchor plate 15. On the other hand, when the lever 18 assumes the position of FIG. 3, the front long edge 18c of the lever 18 forms an inclined cam surface.

In the present embodiment, the terminal 23 of the rack 24 which is a driving member is operatively attached to the lever 18 so as to suitably operate the lever 18 through the connecting rod 21, whereas alternatively the terminal 23 may be operatively attached directly to the lever 18 without the intermediary of the connecting rod 21.

The anchor plate 15 has an inclined surface 15d in the rear upper portion thereof to enable the anchor plate 15 to come smoothly to the seat occupant restraining position.

The latch base 5 is fixed to the vehicle body by means of bolts 25 and 26, and in the front end portion thereof a pin member 27 which is a locking member is provided for movement along a direction perpendicular to the direction of movement of the anchor plate 15 so that it can extend into and retract from the movement path of the anchor plate 15 through a hole. The locking member 27 is biased toward its extended position by a compression spring 28. The locking member may be a pivotable brake member or the like. Attached to the latch base 5 is a compression spring device for shocklessly receiving the anchor plate 15 having run to the seat occupant restraining position as it collides against such spring device. This spring device comprises a compression spring 31 contained in an outer box member 29 and an inner box member 30 nestably fitted to each other.

Operation of the present embodiment constructed as described above will now be described.

When the anchor plate 15 is in the seat occupant restraining position of FIG. 2, the locking member 27 and the locking surface formed by the front end surface of the anchor plate 15 and the front long edge 18c of the lever 18 are spaced apart from each other. However, if a force is imparted from the webbing 11 to the anchor plate 15 to try to move the anchor plate forwardly (leftwardly in FIG. 2), the locking surface of the anchor plate 15 and the lever 18 strike against the locking member 27 and thereby prevent forward movement of the anchor plate 15. That is, the load exerted on the webbing 11 is transmitted to the anchor plate 15, the locking member 27 and the latch base 5 and is received by the vehicle body through bolts 25 and 26 passed through the mounting holes of the latch base 5. In the seat occupant restraining position, the locking surface and the locking member 27 need not be spaced apart from each other but may be in contact with each other, with the locking member 27 being forward of the locking surface.

Figure 4:
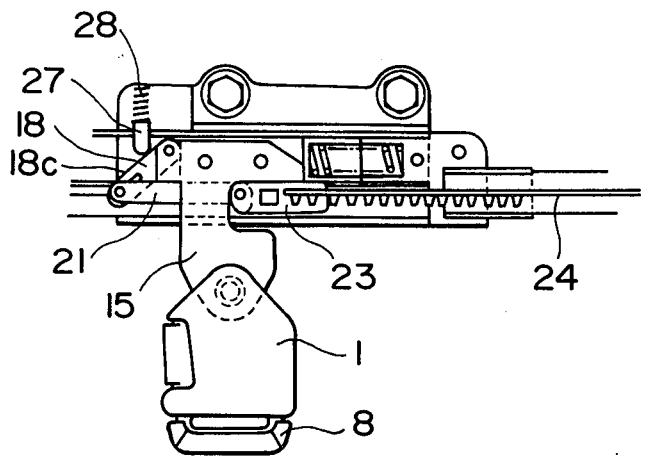

Next, when the anchor plate 15, etc. try to move toward the seat occupant liberating position in response to the opening of the door, the lever 18 is first pivoted forwardly by forward movement of the rack 24 as shown in FIG. 3 and, when the front end surface of the terminal 23 bears against the end surface 15c of the cut-away portion of the anchor plate 15, both the anchor plate 15 and the lever 18 begin to move forwardly. At this time, the anchor plate 15 and the lever 18 advance while the locking member 27 is being retracted from the movement path of the anchor plate against the biasing force of the compression spring 28 by the inclined cam surface formed by the outer long edge 18c of the lever 18, as shown in FIG. 4, so that the anchor plate 15 smoothly moves forwardly toward the seat occupant liberating position. When the anchor plate arrives at the seat occupant liberating position, it engages the limit switch 12 to stop the rack 24 and the anchor plate is stopped thereat.

When the anchor plate 15 in the seat occupant liberating position is moved rearwardly toward the seat occupant restraining position of FIG. 2 by the rack 24, that is moved rearwardly in response to the closing of the door, the lever 18 is pivoted rearwardly as shown in FIG. 5 and the locking surface is formed again by the front long edge 18c of the lever 18 and the front end surface of the anchor plate 15. The inclined surface 15d of the anchor plate 15 first engages the locking member 27 and retracts it upwardly as the anchor plate 15 comes into the seat occupant restraining position, and the anchor plate operates the unshown limit switch while, at the same time, it strikes against the outer box member 29 of the compression spring device, whereby it is stopped with the shock absorbed by the compression spring device.

In the present embodiment the locking surface is formed by the front end surface of the anchor plate 15 and the front long edge of the lever 18, but the locking surface may be formed by only the front end surface of the anchor plate 15 or the front long edge of the lever 18.

According to the present invention, as described above, the locking surface and the cam surface are suitably formed at the foremost portion of the anchor member by movement of the pivotable member, and, therefore, the anchor member can be designed such that it lies completely rearwardly relative to the locking member in the seat occupant restraining position, and, accordingly, a locking device can be provided which is reliable in operation without requiring that the stop position of the anchor member in the seat occupant restraining position be strictly precise. Further, the anchor member need not specially be formed with a locking surface and this leads to simplicity of the construction.

I claim:

1. A locking device for a moving anchor used in an automatic seat belt system, having:

an anchor member movable between a rearward, seat occupant restraining position and a forward, seat occupant liberating position along a guide member secured to a vehicle body;

a pivotable member pivotably mounted on said anchor member;

a driving member operatively connected to said pivotable member so as to pivotally move said pivotable member between a first position and a second position, said driving member moving said pivotable member to said first position when said driving member is moved from the seat occupant liberating position toward the seat occupant restraining position in response to the closing of a door and thereafter moving said pivotable member and said anchor member together to the seat occupant restraining position, said driving member moving said pivotable member to said second position when said driving member is moved from the seat occupant restraining position toward the seat occupant liberating position in response to the opening of the door and thereafter moving said pivotable member and said anchor member together to the seat occupant liberating position;

a locking member provided on a base member secured to the vehicle body and adapted for movement between a locking position at which the locking member prevents the movement of said anchor member to the seat occupant liberating position and a non-locking position at which the locking member permits movement of said anchor member to the seat occupant liberating position; and a biasing member biasing said locking member toward said locking position;

at least one of said pivotable member and said anchor member forming a locking surface engageable with said locking member in its locking position when said anchor member is in said seat occupant restraining position and said pivotable member is in said first position in order to prevent movement of said anchor member to said seat occupant liberating position, said locking member being located forwardly of said locking surface when said anchor member is in said seat occupant restraining position, and said pivotable member in said second position forming a cam surface which moves said locking member to its non-locking position when said anchor member and said pivotable member are about to be moved from the seat occupant restraining position toward the seat occupant liberating position by said driving member.

2. The locking device according to claim 1, wherein said locking member is a pin member movable in a direction perpendicular to the direction of movement of said anchor member, said locking surface is perpendicular to said direction of movement, said cam surface is inclined with respect to said direction of movement, and the rear end portion of said anchor member is formed with an inclined surface for forcing said locking member to said non-locking position against the biasing force.

3. The locking device according to claim 1, wherein said pivotable member is a lever member, one end of which is pivotably mounted on said anchor member and the other end of which is operatively connected to said driving member.

4. The locking device according to claim 1, wherein one end of said driving member is operatively connected to said pivotable member through a connecting rod.

5. The locking device according to claim 1, wherein said locking member is positioned so that there is a space between said locking surface and said locking member when said anchor member is in the seat occupant restraining position.

* * * * *